United States Patent [19]
Adams

[11] 3,884,959
[45] May 20, 1975

[54] AROMATIC ESTERS OF ANTHRANILIC ACID

[75] Inventor: John Howard Adams, San Rafael, Calif.

[73] Assignee: Chevron Research Company, San Francisco, Calif.

[22] Filed: Feb. 13, 1973

[21] Appl. No.: 331,717

Related U.S. Application Data

[60] Division of Ser. No. 227,609, Feb. 18, 1972, Pat. No. 3,758,437, which is a continuation-in-part of Ser. No. 102,968, Dec. 30, 1970, abandoned.

[52] U.S. Cl....... 260/471 R; 260/472; 260/570.5 R; 260/608; 260/609 R; 260/613 R
[51] Int. Cl.................... C07c 101/54; C07c 149/42
[58] Field of Search........................ 260/471 R, 472

[56] References Cited
UNITED STATES PATENTS

| | | | |
|---|---|---|---|
| 3,123,631 | 4/1964 | Staiger et al. | 260/471 R |
| 3,342,801 | 9/1969 | Illy | 260/162 |

Primary Examiner—Lorraine A. Weinberger
Assistant Examiner—Michael Shipper
Attorney, Agent, or Firm—G. F. Magdeburger; John Stoner, Jr.; S. R. LaPaglia

[57] ABSTRACT

Normally solid crystalline polypropylene is stabilized by esters of anthranilic acid of the formula:

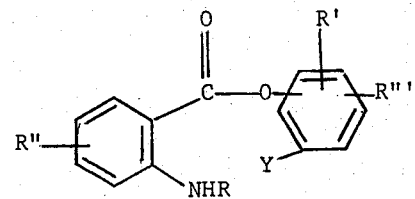

in which R is H or an alkyl group of 1 to 4 carbon atoms, R' and R'' are H, alkyl groups of 1 to 20 carbon atoms, halogens, and alkoxyl groups of 1 to 20 carbon atoms, R''' is an alkyl group of 5 to 20 carbon atoms either straight or branched chain in structure, and Y is H or has the structure:

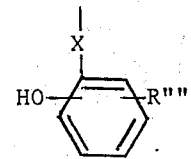

wherein R'''' is H or an alkyl group of 1 to 20 carbon atoms, X is —O—, —S—$_n$, or

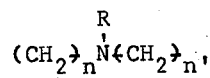

where $n$ and $n'$ may be the same or different and have a value from 1 to 5, said ester of anthranilic acid being present in an amount sufficient to enhance the stability of said composition against UV and heat degradation.

3 Claims, No Drawings

AROMATIC ESTERS OF ANTHRANILIC ACID

This application is a division of application Ser. No. 227,609, filed Feb. 18, 1972, now U.S. Pat. No. 3,758,437 issued Sept. 11, 1973, which, in turn, is a continuation-in-part of U.S. application Ser. No. 102,968, filed Dec. 30, 1970, and now abandoned.

FIELD OF INVENTION

This invention relates to normally solid crystalline polypropylene compositions of enhanced stability containing aromatic esters of anthranilic acid as stabilizers and certain aromatic esters of anthranilic acid as novel compounds.

DESCRIPTION OF INVENTION

The novel compositions of this invention comprise normally solid, substantially crystalline polypropylene and a minor proportion of ester of anthranilic acid having the general structure:

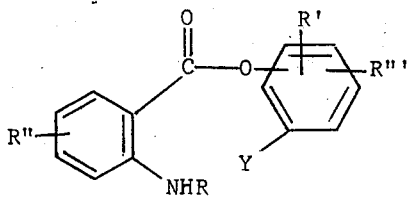

in which R is H or an alkyl group of 1 to 4 carbon atoms, R' and R'' are H, alkyl groups of 1 to 20 carbon atoms, halogens, and alkoxyl groups of 1 to 20 carbon atoms, R''' is an alkyl group of 5 to 20 carbon atoms either straight or branched chain in structure, and Y is H or has the structure:

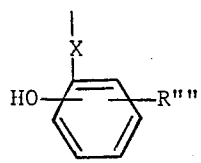

wherein R'''' is H or an alkyl group of 1 to 20 carbon atoms, X is

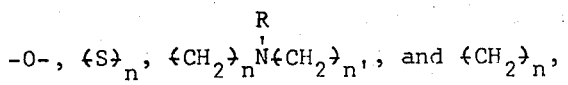

where $n$ and $n'$ may be the same or different and have a value from 1 to 5, said ester of anthranilic acid being present in an amount sufficient to enhance the stability of said composition against UV and heat degradation.

The novel stabilizers of this invention are aromatic esters of anthranilic acid of the formula:

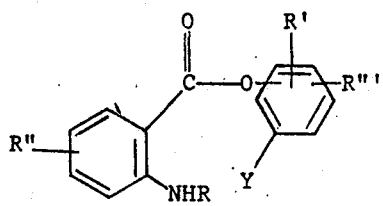

in which R is H or an alkyl group of 1 to 4 carbon atoms, R' and R'' are H, alkyl groups of 1 to 20 carbon atoms, halogens, and alkoxyl groups of 1 to 20 carbon atoms, R''' is an alkyl group of 5 to 20 carbon atoms either straight or branched chain in structure, and Y has the structure:

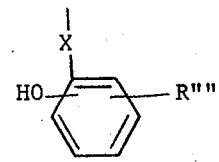

wherein R'''' is H or an alkyl group of 1 to 20 carbon atoms, X is

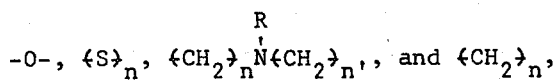

where $n$ and $n'$ may be the same or different and have a value from 1 to 5.

The aromatic esters of anthranilic acid of this invention are made by heating a mixture of a phenol with isotoic anhydride until the evolution of carbon dioxide ceases. The reaction is as follows:

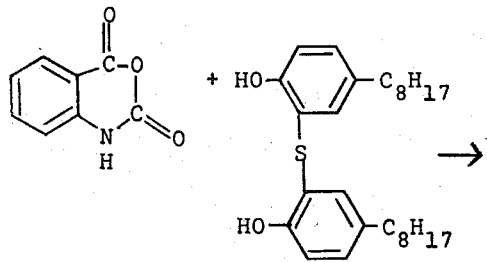

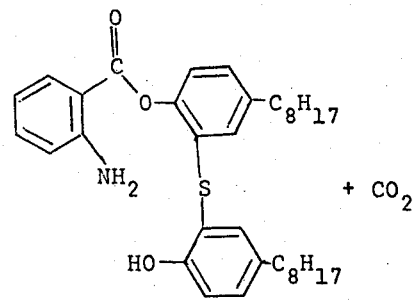

The following examples illustrate the aromatic esters of anthranilic acid and normally solid, substantially crystalline polypropylene compositions containing them. Unless otherwise indicated, the proportions are on a weight basis.

Example 1

Preparation of 2,2'-Thiobis(4-octylphenol) Monoester of Anthranilic Acid

In a 250-ml Erlenmeyer flask on a heater with magnetic stirrer, 4.05 g (25 mmoles) of isatoic anhydride, 11.05 g (24 mmoles) of 2,2'-thiobis(4-octylphenol) and 0.05 g of powdered sodium hydroxide were stirred in 150 ml 1,4-dioxane and slowly heated to reflux for one hour. The reaction mixture was then cooled, poured into 600 ml water, and ether extracted. After evaporating to dryness and obtaining a weight of 13.6 g (97% of theory), the material was crystallized from methanol to yield 1.3 g of 2,2'-thiobis(4-octylphenol) monoester of anthranilic acid as light tan globules, melting point 155.5°–156.5°C. Calculated for $C_{35}H_{47}NSO_3$: C, 74.81; H, 8.43; N, 2.50; S, 5.70. Found: C, 74.55; H, 8.24; N, 2.51; S, 5.88.

The infrared spectrum contained two sharp N-H bands at 3500 $cm^{-1}$ and 3380 $cm^{-1}$, a small broad O—H band at 3425 $cm^{-1}$, and an aromatic ester carbonyl band at 1,705 $cm^{-1}$.

The UV spectrum contained two absorptions above 2,400 A: at 2,900 A ($\epsilon = 5,400$) and 3,400 A ($\epsilon = 6,000$).

Other aromatic esters of anthranilic acid were prepared by the general method described in Example 1. The compounds of the examples and their evaluation in normally solid, substantially crystalline polypropylene are set out in the following table.

TABLE

| Example Number | R | R'' | R'''(1) | R''''(1) | Y(2) | 0.5% in Polypropylene Time to Sample Failure | |
|---|---|---|---|---|---|---|---|
| | | | | | | 138°C Oven Hr | FS/BL, Hr |
| 1 | H | H | 8 | 8 | —S—* | 615 | 1235 |
| 2 | H | H | 8 | | H | 20 | 1250 |
| 3 | $CH_3$ | H | 8 | 8 | —S—* | 144 | 317 |
| 4 | H | Cl | 8 | 8 | —S—* | 750 | 167 |
| 5 | H | $NO_2$ | 8 | 8 | —S—* | 960 | 408 |
| 6 | H | H | 12 | 12 | —S—S—* | 884 | 500 |
| 7 | H | H | 8 | 8 | —$CH_2$—NC-$H_3$—$CH_2$—* | 126 | 473 |

(1) Numbers refer to number of carbon atoms in corresponding R''' and R'''' alkyl groups of structural formulae.
(2)* Phenolic group having the structure

in the above formula.

In addition to the compounds of the above examples and their evaluation, other sulfur-bridged phenolic esters of anthranilic acid in accordance with this invention are conveniently illustrated in the following list of examples. In this listing the characteristics of the esters are identified in the same manner as in the foregoing table.

| Example Number | R | R' | R'' | R''' | R'''' | Y(2) |
|---|---|---|---|---|---|---|
| 8 | H | $CH_3$ | $CH_3$ | 8 | 8 | —S—* |
| 9 | $CH_3$ | $C_2H_5$ | $C_2H_5$ | 12 | 12 | —S—* |
| 10 | H | $CH_3$ | $C_{10}H_{21}$ | 8 | 8 | —S—S—* |
| 11 | $C_3H_7$ | $CH_3$ | $C_4H_9$ | 12 | 12 | —S—* |
| 12 | H | $C_{12}H_{25}$ | $CH_3$ | 8 | 12 | —S—* |

In the above evaluation the "FS/BL" refers to the standard fluorescent sunlamp/Black Light Weather-Ometer to give the hours exposure causing failure of the sample when it is flexed.

As already mentioned, the aromatic esters of anthranilic acid of this invention have a remarkable ability to enhance the resistance of normally solid substantially crystalline polypropylene to UV and thermal degradation. In the preparation of suitable polypropylene compositions the aromatic esters of anthranilic acid are mixed homogeneously with such polypropylene at concentrations of at least about 0.05 percent by weight and usually from about 0.05 to 0.50 percent by weight based on the polypropylene. Homogeneous mixing is achieved by blending the polymer and the ester in powder form in conventional powder blenders or by mixing them in conventional melt blenders. Minor amounts of other polymers, pigments, photostabilizers, oxidation stabilizers, heat stabilizers, dye acceptors, dyes, fillers, and the like may also be incorporated into these mixtures.

The normally solid, substantially crystalline polypropylene which is stabilized by the aromatic esters of anthranilic acid in accordance with this invention is a well-known commercial commodity. It is normally at least about 85% crystalline. It is essentially insoluble in refluxing heptanes.

As indicated in the above table, each of the aromatic esters of anthranilic acid was mixed with polypropylene powder at a concentration of 0.5 percent. The dry mixture was pressed into 20-mil thick sheets. These sheets were tested in an oven at 138°C to determine their life as expressed in hours. The polypropylene sheets were also exposed to a fluorescent sunlamp-black light Weather-Ometer and flexed periodically to obtain a time to flexural failure.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

What is claimed is:

1. Ester of anthranilic acid having the following structure:

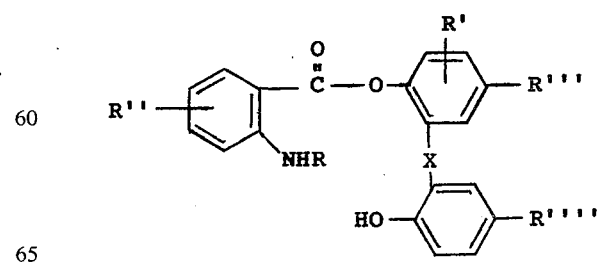

in which
R is H or an alkyl group of 1 to 4 carbon atoms,
R' and R'' are H, $NO_2$, alkyl groups of 1 to 20 carbon atoms or halogen, R''' is an alkyl group of 5 to 20 carbon atoms either straight or branched chain in structure,
R'''' is H or an alkyl group of 1 to 20 carbon atoms, and
X is $-(S)_n-$, or 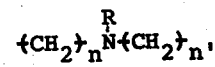
where $n$ and $n'$ are the same or different and have a value from 1 to 5.
2. The compound of claim 1 wherein X is S.
3. The compound of claim 1 wherein R''' and R'''' are alkyl groups of 8 carbon atoms each.